US008468511B2

(12) United States Patent
Lapkowski et al.

(10) Patent No.: US 8,468,511 B2
(45) Date of Patent: Jun. 18, 2013

(54) USE OF NAME MANGLING TECHNIQUES TO ENCODE CROSS PROCEDURE REGISTER ASSIGNMENT

(75) Inventors: Christopher A. Lapkowski, Calgary (CA); Kevin A. Stoodley, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 1206 days.

(21) Appl. No.: 12/347,229

(22) Filed: Dec. 31, 2008

(65) Prior Publication Data

US 2010/0169872 A1 Jul. 1, 2010

(51) Int. Cl.
*G06F 9/45* (2006.01)

(52) U.S. Cl.
USPC .............................. 717/154; 717/140; 717/157

(58) Field of Classification Search
None
See application file for complete search history.

(56) References Cited

U.S. PATENT DOCUMENTS

| | | | | |
|---|---|---|---|---|
| 5,428,793 | A * | 6/1995 | Odnert et al. | 717/157 |
| 5,535,391 | A * | 7/1996 | Hejlsberg et al. | 717/140 |
| 6,059,839 | A * | 5/2000 | Dehnert et al. | 717/154 |
| 6,408,433 | B1 * | 6/2002 | Click et al. | 717/154 |
| 6,481,008 | B1 | 11/2002 | Chaiken et al. | |
| 6,487,716 | B1 * | 11/2002 | Choi et al. | 717/159 |
| 7,216,341 | B2 | 5/2007 | Guarraci | |
| 8,117,604 | B2 * | 2/2012 | Archambault et al. | 717/147 |
| 2004/0083483 | A1 | 4/2004 | Yamamoto et al. | |
| 2006/0206880 | A1 * | 9/2006 | Barraclough et al. | 717/140 |
| 2008/0028383 | A1 * | 1/2008 | Archambault et al. | 717/157 |
| 2008/0034361 | A1 * | 2/2008 | Ansari et al. | 717/154 |

OTHER PUBLICATIONS

Fog, A., Calling conventions for different C++ compilers and operating systems, Copenhagen University College of Engineering, 2007, 51 pages, [retrieved on Feb. 1, 2013], Retrieved from the Internet: <URL: http://web.archive.org/web/ 20070927214243/http://www. agner.org/optimize/calling_conventions.pdf>.*
Davidson, J., et al., Methods for Saving and Restoring Register Values across Function Calls, Software Practice and Experience. vol. 21(2), 149-165 (Feb. 1991), [retrieved on Feb. 4, 2013], Retrieved from the Internet: <URL: http://citeseerx.ist.psu.edu/>.*
"Name mangling", Wikipedia, pp. 1-8, retrieved Sep. 11, 2008 http://en.wikipedia.org/wiki/Name_mangling.
"Calling convention", Wikipedia, pp. 1-3, retrieved Sep. 11, 2008 http://en.wikipedia.org/wiki/Calling_convention.
"Interprocedural optimization", Wikipedia, pp. 1-4, retrieved Sep. 11, 2008 http://en.wikipedia.org/wiki/Interprocedural_analysis.

* cited by examiner

*Primary Examiner* — Thuy Dao
*Assistant Examiner* — Geoffrey St Leger
(74) *Attorney, Agent, or Firm* — Yee & Associates, P.C.; David A. Mims, Jr.

(57) ABSTRACT

Optimizing a program having a plurality of functions using an optimization technique that requires breaking a calling convention. A first function of the plurality of functions is modified as a result of optimizing. A name of the first function is mangled to form a unique first mangled name changing the name of the first function to include, as a result of mangling, first information conveying at least in part how the first function was modified. A second function of the plurality of functions, being a caller of the first function, is also modified to correctly invoke the first function using the unique first mangled name to apply the optimization technique. A compilation tool can, after optimizing, use the first information to take a first action with respect to the first procedure, wherein the compilation tool otherwise would require the calling convention to remain unbroken to take the first action.

20 Claims, 3 Drawing Sheets

USE OF NAME MANGLING TECHNIQUES TO ENCODE CROSS PROCEDURE REGISTER ASSIGNMENT

BACKGROUND OF THE INVENTION

1. Field of the Invention

The present invention relates generally to an improved data processing system and, in particular, to the compilation of computer-usable program code. Still more particularly, the present invention relates to use of name mangling techniques to encode cross procedure register assignment.

2. Description of the Related Art

Compilers are software programs used to translate program instructions written in a source language to equivalent program instructions written in a target language. The source language is usually a high-level language designed to be interpreted by humans; the target language is usually a low-level language suitable for execution by computer hardware. In this common case, the compiler is said to compile the source code into executable code.

Different kinds of compilers can perform different functions. For example, optimizing compilers are used to improve the quality of the program instruction generated without changing the intended meaning of the source code. For example, an optimizing compiler can reduce the time required to execute the program instructions or the memory footprint of the resulting program. During the optimization process, the source code is often re-ordered so that commands are executed more efficiently.

Many programs to be optimized can typically be characterized as sets of procedures, functions, or possibly methods, hereafter referred to as "functions." Each function is intended to perform some particular task towards the overall goal of the program as a whole. Each program comprises one or more related functions. For example, a program can have the goal of comparing home prices in Texas at different times to home prices in California at one selected time. One function may be to calculate the averages of home prices in Texas at different times and a second function may be to calculate the average price of homes in California at the selected time. A third function may be to calculate the average of home prices in Texas at a given time relative to the home prices in California at the specified time. This third function might be iterated until all comparisons are made of each time for Texas homes relative to the one selected time for California homes.

Each of these three functions may include calls to one or more functions to accomplish these tasks. For example, a function would calculate the mathematical average of a set of numbers, which in this case would be a set of home prices in the relevant state.

Continuing this example, a programmer desires to optimize this overall program using an optimizing compiler. Much freedom exists to perform transformations within each of the three individual functions. When optimizing transformations are applied within a given function, such an optimizing transformation is known as an intraprocedural optimization. However, additional optimization can be achieved by performing a technique known as interprocedural analysis.

Interprocedural analysis is a compiler technique used to improve performance in programs containing frequently used functions, where the analysis spans the scope of more than one function. In the above example, calculation of the price of homes in California only needs to be performed once for the one selected time. While this value can be calculated each time the price of homes in Texas is calculated at a particular time, such additional calculation is wasteful. Instead, the average price of homes for the one selected California time can be calculated once, stored, and then referenced by the third function that performs the comparison between home prices between Texas and California homes. Interprocedural analysis can detect this potential optimization. Thereafter, interprocedural optimization can be used to modify the program to take advantage of this optimization.

Whether or not the program is complex, interprocedural optimization can sometimes lead to transformation and optimization across function boundaries. However, in computer programming, such transformations are often limited by calling conventions imposed by the computer's operating system.

A calling convention is a standardized method for a program to pass parameters to a function, and receive a result value back from that function. Many different calling conventions exist. Calling conventions indicate the roles of all registers of the computer's central processing unit. A register is an atomic memory element within the central processing unit. Some registers are indicated as "callee save," whereas other registers are indicated as "caller save." A specific subset of registers is also indicated for purposes of parameter passing.

In the above example program, restrictions imposed by the calling conventions of the computer's operating system could prevent implementation of the identified optimization of storing the average price of California homes at the one selected time in a register, as generated by the first function, and then referencing that value directly from the register the next time the third function is to use that value (as opposed to recalculating the average price of California homes at the selected time or loading a value from main memory). Thus, the goal of optimizing the program can be thwarted by the requirements of calling conventions.

In some cases, this limitation can be overcome by deliberately breaking the calling conventions. However, breaking calling conventions must be done with great care, and only on internally visible functions or when performing a whole program compilation. Additionally, use of other optimizing tools must be relinquished in favor of using the technique of breaking the calling conventions. For example, code instrumenting tools, debugging tools, and post compilation object code optimizers cannot be used because these tools fundamentally rely on calling conventions. Thus, the goal of fully optimizing the program is again thwarted.

BRIEF SUMMARY OF THE INVENTION

The illustrative embodiments provide for a computer-implemented method, computer program product, and data processing system for optimizing a program comprising a plurality of functions. A determination is received, after an interprocedural analysis that the program can benefit from an optimization technique that requires breaking a calling convention of an operating system loaded on a computer on which the program will be executed after optimization. The program is optimized using the optimization technique. The calling convention is broken during optimizing, and a first function of the plurality of functions is modified as a result of optimizing. A name of the first function is mangled to form a unique first mangled name. Mangling comprises changing the name. The unique first mangled name includes, as a result of mangling, first information conveying at least in part how the first function was modified. A compilation tool can, after optimizing, use the first information to take a first action with respect to the first function, wherein the compilation tool otherwise would require the calling convention to remain unbroken in order to take the first action. Responsive to a second function of the plurality of functions being a caller of the first function, the second function is modified to correctly invoke the first function using the unique first mangled name, wherein the modifying allows the first information passed in the first unique mangled name to be used to correctly process the broken calling convention of the first function.

DETAILED DESCRIPTION OF THE INVENTION

Figure 1:
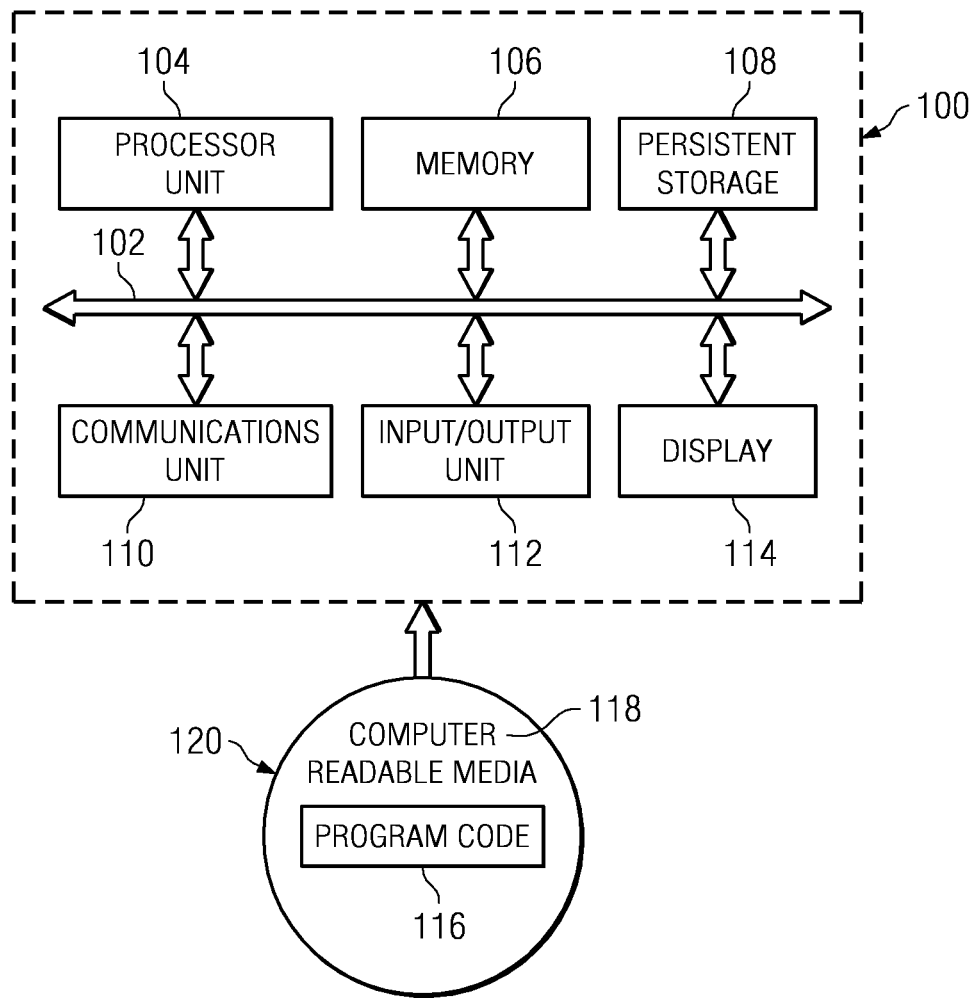
FIG. 1 is a block diagram of a prior art data processing system, in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer, or other programmable data processing apparatus, create means for implementing the functions/acts specified in the flowchart and/or block diagram block or blocks. These computer program instructions may also be stored in a computer-readable medium that can direct a computer, or other programmable data processing apparatus, to function in a particular manner, such that the instructions stored in the computer-readable medium produce an article of manufacture including instruction means which implement the function/act specified in the flowchart and/or block diagram block or blocks.

The computer program instructions may also be loaded onto a computer, or other programmable data processing apparatus, to cause a series of operational steps to be performed on the computer, or other programmable apparatus, to produce a computer-implemented process such that the instructions which execute on the computer, or other programmable apparatus, provide processes for implementing the functions/acts specified in the flowchart and/or block diagram block or blocks.

FIG. 1 is a block diagram of a prior art data processing system. Data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices. A storage device is any piece of hardware that is capable of storing information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer-implemented instructions, which may be located in a memory, such as memory 106. These instructions are referred to as program code, computer-usable program code, or computer-readable program code that may be read and executed by a processor in processor unit 104. The program code in the different embodiments may be embodied on different physical or tangible computer-readable media, such as memory 106 or persistent storage 108.

Program code 116 is located in a functional form on computer-readable media 118 that is selectively removable and may be loaded onto or transferred to data processing system 100 for execution by processor unit 104. Program code 116 and computer-readable media 118 form computer program product 120 in these examples. In one example, computer-readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer-readable media 118 also may take the form of a persistent storage, such as a hard drive, a thumb drive, or a flash memory that is connected to data processing system 100. The tangible form of computer-readable media 118 is also referred to as computer-recordable storage media. In some instances, computer-readable media 118 may not be removable.

Alternatively, program code 116 may be transferred to data processing system 100 from computer-readable media 118 through a communications link to communications unit 110 and/or through a connection to input/output unit 112. The communications link and/or the connection may be physical or wireless in the illustrative examples. The computer-readable media also may take the form of non-tangible media, such as communications links or wireless transmissions containing the program code.

In some illustrative embodiments, program code 116 may be downloaded over a network to persistent storage 108 from another device or data processing system for use within data processing system 100. For instance, program code stored in a computer-readable storage medium in a server data processing system may be downloaded over a network from the server to data processing system 100. The data processing system providing program code 116 may be a server computer, a client computer, or some other device capable of storing and transmitting program code 116.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108, and computer-readable media 118 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Figure 2:
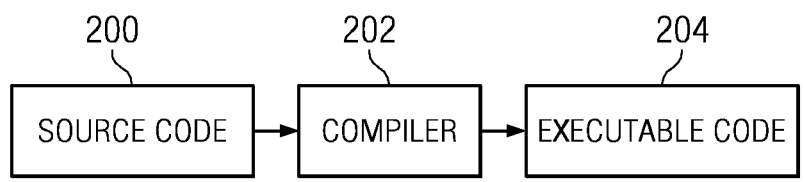
FIG. 2 is a block diagram of a prior art compiler, in which illustrative embodiments may be implemented.

FIG. 2 is a block diagram of a prior art compiler. Source code 200 is created by one or more of a number of known techniques, such as automatically, or by a human programmer. Compiler 202 and executable code 204 are computer-usable programs that can be used in a data processing system, such as data processing system 100 in FIG. 1.

Source code 200 defines how a program will eventually operate, but source code 200 is usually not in a desired format for execution on a data processing system. Instead, source code 200 is often in a format that is easier for a human to interpret. After source code 200 has been defined, source code 200 is provided to compiler 202. A typical compiler is a computer program that translates a series of statements written in a first computer language, such as source code 200, into a second computer language, such as executable code 204. The second computer language, such as executable code 204, is often called the object or target language.

Thus, compiler 202 is, itself, a computer program designed to convert source code 200 into executable code 204. After compiler 202 has performed its programmed actions on source code 200, compiler 202 outputs executable code 204. Executable code 204 is generally in a desired computer-usable format and is ready for use in a data processing system.

Typical compilers output objects that contain machine code augmented by information about the name and location of entry points and external calls to functions not contained in the object. A set of object files, which need not have come from a single compiler provided that the compilers used share a common output format, may then be linked together to create the final executable code. The executable code can then be run directly by a user.

Most compilers translate a source code text file, written in a high-level language, to object code or machine language, such as into an executable .EXE or .COM file that may run on a computer or a virtual machine. However, translation from a low-level language to a high-level language is also possible. Such a compiler is normally known as a decompiler if the compiler is reconstructing a high-level language program which could have generated the low-level language program. Compilers also exist which translate from one high-level language to another high-level language, or sometimes to an intermediate language that still needs further processing.

Although the example in FIG. 2 refers to executable code 204 as being the result of the action of compiler 202 on source code 200, executable code 204 could be other forms of code. For example, if compiler 202 were an optimizing compiler, then executable code 204 could instead be referred-to as "optimized code," whether or not the optimized code is actually executable.

The illustrative embodiments provide for a computer-implemented method, computer program product, and data processing system for optimizing a program comprising a plurality of functions. The functions may be located in the same compilation unit, as in a source file. If an analysis of a whole program is performed, the functions may also be located in different compilation units. A determination is received, after an interprocedural analysis that the program can benefit from an optimization technique that requires breaking a calling convention of an operating system loaded on a computer on which the program will be executed after optimization. The program is optimized using the optimization technique. The calling convention is broken during optimizing, and a first function in the plurality of functions is modified as a result of optimizing. A name of the first function is mangled to form a unique first mangled name. Mangling comprises changing the name. The unique first mangled name includes, as a result of mangling, first information conveying at least in part how the first function was modified. A compilation tool can, after optimizing, use the first information to take a first action with respect to the first function, wherein the compilation tool otherwise would require the calling convention to remain unbroken in order to take the first action.

Figures 3, 4:
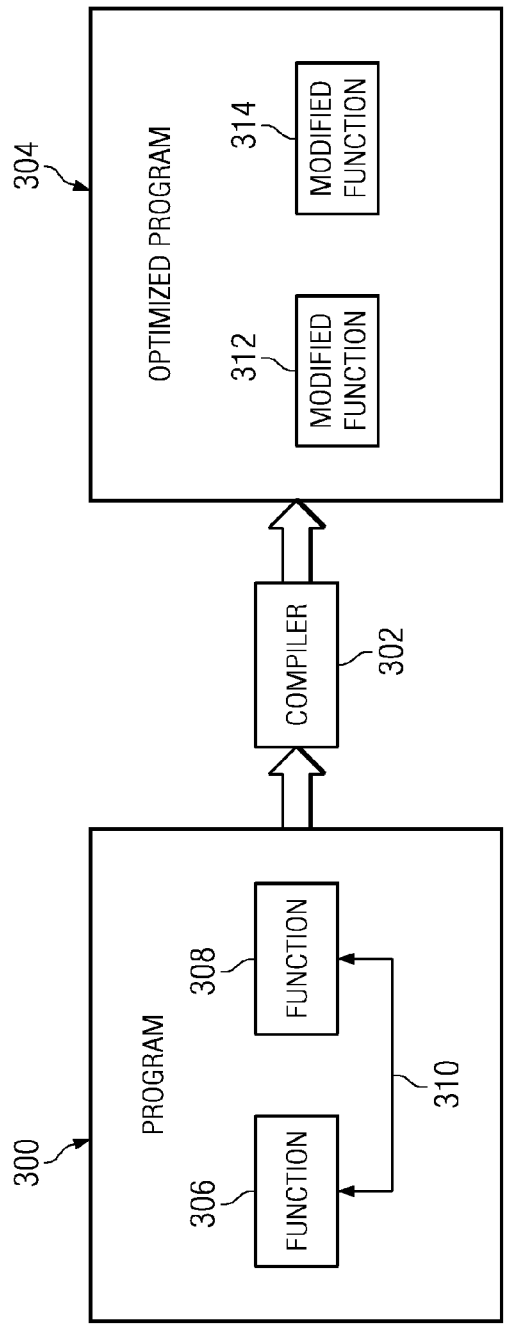
FIG. 3 is a block diagram representing a compilation of a program, in accordance with an illustrative embodiment.
FIG. 4 shows a function name and an example of name mangling, in accordance with an illustrative embodiment.

FIG. 3 is a block diagram representing a compilation of a program, in accordance with an illustrative embodiment. Program 300 could be source code 200 of FIG. 2, compiler 302 could be compiler 202 of FIG. 2, and optimized program 304 could be executable code 204 of FIG. 2. However, in the illustrative embodiment of FIG. 3, optimized program 304 is an intermediate code that is not executable code. The methods described with respect to FIG. 3 can be implemented in a processor, such as processor unit 104 of FIG. 1, and can specifically be implemented in compiler 302.

In the illustrative embodiment of FIG. 3, program 300 includes two functions, function 306, and function 308. In other illustrative embodiments, program 300 could include many different procedures or functions. Each procedure or function may contain calls to one or more functions. In the illustrative embodiment of FIG. 3, program 300 includes function 306 and function 308. In other illustrative embodiments, program 300 could include many different functions. Thus, the program comprises a first function and a second function.

Before compilation, an interprocedural analysis is performed on program 300. As a result of interprocedural analysis, a determination is made that program 300 can benefit from an optimization technique that requires breaking a calling convention of an operating system loaded on a computer on which the program will be executed after optimization. The process and scope of interprocedural analysis is represented by arrows 310. The scope in this example therefore encompasses only two functions, but in alternative embodiments involve many functions. Scope in this case is defined by interaction between the first and second functions in that the second function calls the first function. Other calling relationships may be defined. This determination is received in compiler 302, or whatever program will be performing interprocedural optimization.

Next, compiler 302 performs interprocedural optimization on program 300. During interprocedural optimization, the calling convention is broken in order to take full advantage of the illustrative interprocedural optimization. During the interprocedural optimization, function 306 is modified to become modified function 312. Possibly in addition to this modification, one or more of the other functions may be modified. In the illustrative embodiment of FIG. 3, in addition to modified function 312, function 308 is modified to become modified function 314. For the sake of simplified explanation, modification of function 308 will not be described, though the illustrative embodiments do contemplate application of the described methods with respect to function 308, and modified function 314.

When the first function, such as function 306, is optimized the calling convention needs to be broken. The second function, such as function 308, in another compilation unit, contains a call to the first function. The relationship defined between, or dependency associated with, the two functions requires code in the second function to understand the change in the linkage convention as a result of modification of the first function. The change in linkage convention must be made known to the second function to allow the second function to properly call the first function and continue operation. In this example only two functions are shown however the same principle applies when there are more interrelated functions. Associated functions must be made aware of changes in linkage conventions to linked functions to continue to operate correctly.

For functions that the optimizer cannot guarantee to find all callers of the function whose calling convention will be modified and name mangled, optimization may still be performed. Optimization in this case means replicating the function to maintain a traditional compiled version with an unmangled name for use by any functions that are not available to the scope of the optimizer analysis. The traditional version may also have to be maintained to keep function pointers intact. For example, the optimizer will have to keep a traditional version of a function used with indirect function calls and function address comparisons, in the event the optimizer cannot ensure safe use of the address of the function. The traditional version may be referenced as using or supporting standard calling conventions.

Now that interprocedural optimization has been performed on program 300, a user desires to use further optimization tools on the modified functions. However, these optimization tools rely on the calling conventions to have remained unbroken.

To solve this problem, a name of function 306 is mangled. The term "mangled" means changing the name, though the term "name decoration" could be used instead of "name mangling." As a result of mangling the name, a unique first mangled name is formed. The unique first mangled name includes, as a result of mangling, first information uniquely conveying at least in part how the first function was modified. This information is what will allow the optimization tool to determine what calling convention to use, or what action to take. In a specific example, the changes made to the calling convention are encoded in detail in the unique name of the modified function. When the optimization process is repeated on the function to optimize the same function a subsequent time, the same unique mangled name results to ensure repeatable processing.

In other words, the compilation tool can, after optimizing, use the first information to take a first action with respect to the first function, wherein the compilation tool otherwise would require the calling convention to remain unbroken in order to take the first action. In an illustrative embodiment, the information can allow the compilation tool to use the first information to determine the nature of the first action to be taken. The method can then be extended to taking the first action using the compilation tool.

Examples of a first action that can be taken by post compilation optimization/instrumentation tools include ignoring the analysis and optimization or instrumentation of the first function without reporting an error. In another example, the first action can be determined, using the information, which calling convention is used when performing an optimization on the first function. The action may typically be any action performed by one or more of many different optimization tools.

In one example, by mangling the name of function 306, incoming and outgoing registers that are used in a way the does not conform to standard calling convention can be described in the mangled name. With such descriptive information, an object code instrumenting tool can continue to be applied to modified function 312 and modified function 314.

The first function, such as function 306, requires the second function associated with the first function, such as function 308 to be modified as well to continue to operate correctly with the optimized version of the first function. The modification of second function 308 ensures changes in the linkage conventions applied to first function 306, as a result of optimization, are comprehended by the second function to allow continued operation of the functions in a predictable manner. As a result of the optimization process function 306 and function 308 are modified and function 308 can properly call function 306. Generally, dependent functions must be modified to continue to operate with modified functions on which dependent functions are associated or depend.

In another example, using compilation tools, interprocedural analysis can be performed to indicate that a particular value, such as an address of a frequently used structure, should be kept in a register of a processor. Possibly, each function can reconstruct this address on function entry. However, in an optimized program, the value of the address can be passed in a register to the called function, as the address is already available to the caller. Such an optimization is possible, while conforming to the calling conventions, as long as the number of parameters to this function still leaves room for one extra parameter.

On the other hand, if no room is left in the registers used in the parameter list as prescribed by the calling convention, then in order to achieve this optimization, the calling convention would have to be broken. If the called function is not externally visible, breaking the calling convention can typically be performed. When registers are available in the calling convention, there may still be efficiency in defining a new register to hold the value since parameter registers are typically not preserved across the call. In this case, when there are references in the calling function to that value subsequent to the call, then an unnecessary register to register copy operation will have to be added to the code to ensure the value is not lost prior to a last reference to the value. Changing the calling convention to use a register which is both available to the called function but whose contents remain available upon return would allow this code to execute more efficiently.

However, if the called function is not externally visible, then breaking the calling convention will result in object code optimizers and instrumenting code (both of which are intraprocedural optimization tools) being unaware that the interprocedural optimization has occurred. As a result, to the object code optimizer or instrumentation tool, the modified function may appear to be using an uninitialized value as an address. In turn, an error will be reported—although no error actually exists. In any case, the intraprocedural optimization tools are unable to act upon the modified function.

When there are circumstances where the optimizer is unable to be certain that a change in the name of the function can be made safely, the function can be replicated to include a traditional version of the compiled function with an unmangled name to maintain correctness for previous implementations to provide a backward compatibility. Maintaining a traditional version of the function allows the optimizer to perform code optimization while ensuring code that cannot be seen (not in the scope) or tools that may not understand the mangling scheme continue to work as before.

However, using the mangling techniques described above, the name of modified function 312 is changed to contain information usable by the intraprocedural optimization tools. This information can be used to inform the intraprocedural optimization tools to ignore (not work on) modified function 312. This information can also be used to inform the intraprocedural optimization tools to continue to work on modified function 312, using the information in the mangled name to determine which calling convention to use, or otherwise to determine how to operate on modified function 312.

Yet another example can be applied to interprocedural compilers that have multiple compilation units. At link time, an optimization like the one performed in the previous example can be applied to two or more separate compilation units sent to the low level optimizer which performs intraprocedural register allocation. If the intermediate interprocedural compiler decides that it should keep a value in a register, the intermediate interprocedural compiler can inform the low level optimizer about this decision. Consistent name mangling will ensure that custom calling conventions imposed by the interprocedural optimization are consistent in separate compilation units.

Thus, optimizing can be performed using an interprocedural compiler at link time, wherein the interprocedural compiler includes a first compilation unit for operating on the first procedure and a second compilation unit for operating on the second procedure. A consistent name mangling scheme, relative to the first mangled name and the second mangled name, can be maintained using the interprocedural compiler. A name mangling scheme is defined as a naming scheme that names the same types of properties or information in the same manner. The consistent name mangling scheme ensures that custom calling conventions imposed by the interprocedural compiler are consistent in both the first compilation unit and the second compilation unit.

FIG. 4 shows a function name and an example of name mangling, in accordance with an illustrative embodiment. The name mangling techniques described with respect to FIG. 4 can be implemented using the compilers of either FIG.

2 or FIG. 3. The name mangling techniques described with respect to FIG. 3 can be used to mangle function 400 shown in FIG. 4.

In a first example, at a first level of encoding changes to calling conventions in name mangling, the following schema could be used with respect to function 400. The name of function 400 is "user_function_name." Parts of the name space reserved by the language definition for the compiler or which are not names the programmer may legally use should be used in the name mangling process to ensure there are no unintentional name collisions. Programming languages typically have name space rules defined to prevent inadvertent collision of names.

The name of function 400 is pre-pended with a beginning and ending keyword. For example, a beginning keyword could be "IPRA" in order to represent Inter-Procedural Register Allocation. The beginning keyword is separated from the name of function 400 using an invalid character or character sequence that is accepted by linkers, but not accepted by source languages such as C. For example, function 400 could be encoded as IPRA_<encoding>_IPRA.$user_function_name, as shown by line 402.

The registers that do not follow calling conventions for the transformed user function are described in sequence using the register name, followed by "i" and/or "o." These characters indicate if the register has incoming and/or outgoing information. Continuing with this example, suppose that general purpose registers 30 and 31 are used for arguments, but are not the standard argument registers according to the calling convention. Further suppose that register 31 is used to send data to function 400, as well as a result sent out of function 400 through register 31. Register 30 is used only to send data to the function. The user function name could then be mangled to IPRA_gp30i_gp31io_IPRA.$user_function_name, as shown by line 404. Other register classes could have different names, such as fp for floating point registers, vr for vector registers, or many other names.

As can be seen, with a name mangling such as IPRA_gp30i_gp31io_IPRA.$user_function_name (line 404), a post compilation tool can decrypt function 400 "user_function_name" such that its callers provide data in general purpose registers 30 and 31, as well as expect register 31, to be potentially altered with a useful value, whereas register 30 is only used but not altered. Normally, the compilation tool does not recognize register 30 and 31 as being function parameters, as those registers are not part of the calling convention for this particular machine and operating system. However, with the mangled name the compilation tool now knows exactly how the functions behave.

The name mangling process provides descriptive and human readable names. The mangling process provides the descriptive information in a context understandable to a person creating or managing the functions. Other more compact naming schemes typically do not support the human readable format but contain the required information encoded by a number of standard schemes for efficiently encoding information.

In a second example, at a second level of encoding, a compiler is composed of a higher-level optimizer and a low-level optimizer. The higher-level optimizer has a view of multiple program source files, whereas the low-level optimizer receives only one source file (hereafter referred to as a compilation unit) to compile one at a time.

The higher-level optimizer could decide to do some amount of inter-procedural register allocation. The higher-level optimizer may decide that function f1 in one compilation unit should pass an extra argument in a register to function f2. The higher-level optimizer can perform this pass by mangling the function name of function f2 to another name, such as IPRA_gp31iID1_IPRA.$f2, as shown at line 406. The low-level optimizer would see this name mangling and decipher the mangled name so that the low-level optimizer knows that the low-level optimizer should compile function f2 as if the value identified by ID1 will be available in general purpose register 31. Any uses of a variable associated by ID1 (which could be agreed upon to be IPRA.$global_var_ID1, as shown at line 408) should be simply accessed by referring to general purpose register 31 instead of loading from memory.

The high-level optimizer will also alter function f1 in its compilation unit to call IRPA_gp31iID1_IPRA.$f2, instead of f2. The low-level optimizer in this compilation unit will make sure to load the value of the variable associated by ID1 (as previously agreed upon to be IPRA.$global_var_ID1) into general purpose register 31 before the actual function call.

Figure 5:
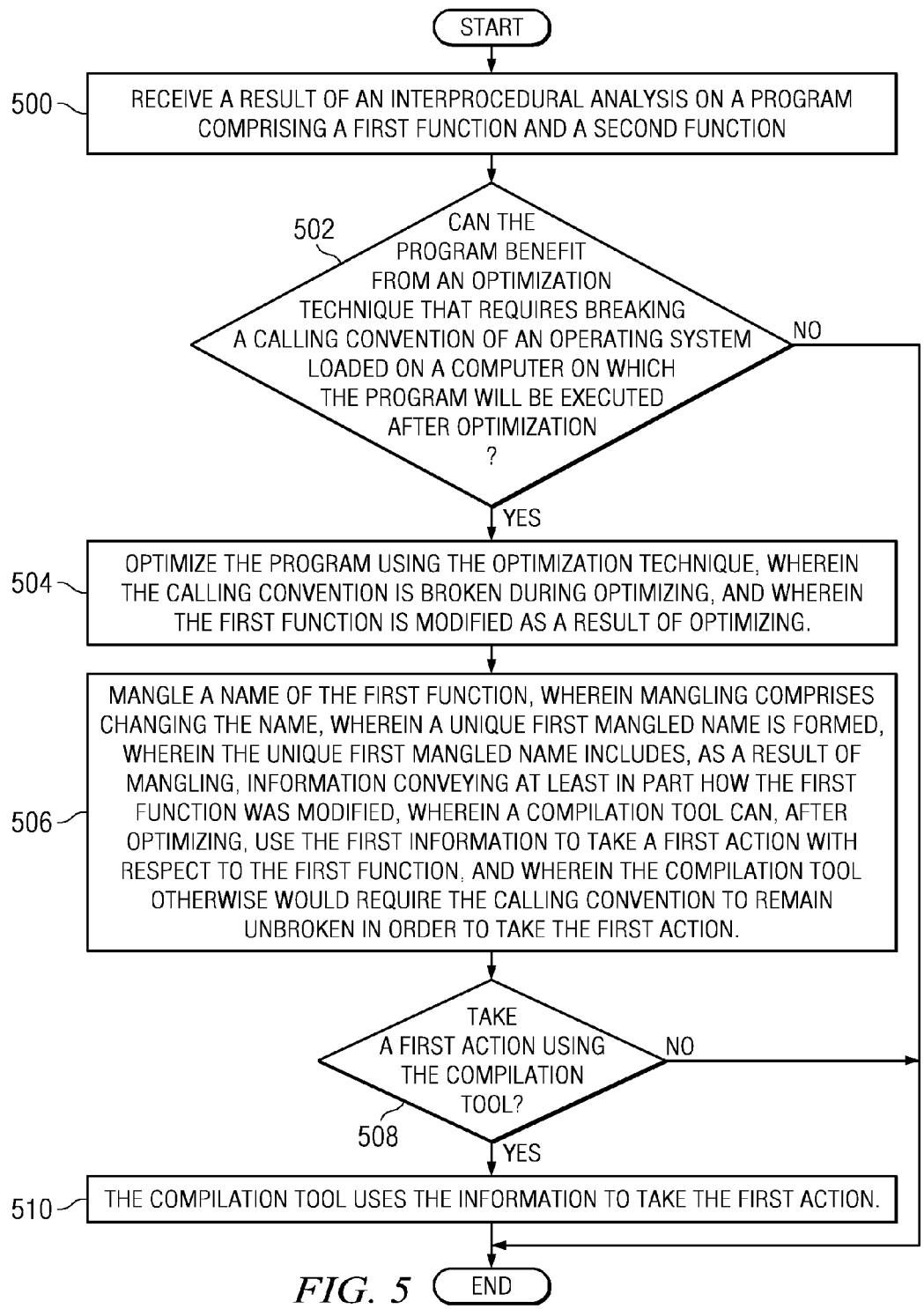
FIG. 5 is a flowchart illustrating use of name mangling techniques to change a name of a procedure to include information usable by post-compilation tools that rely on a calling convention broken during initial optimization of the procedure, in accordance with an illustrative embodiment.

FIG. 5 is a flowchart illustrating use of name mangling techniques to change a name of a procedure to include information usable by post-compilation tools that rely on a calling convention broken during initial optimization of the procedure, in accordance with an illustrative embodiment. The process shown in FIG. 5 can be implemented in a processor, such as processor unit 104 of FIG. 1. Specifically, the process shown in FIG. 5 can be implemented in a compiler, such as compiler 202 of FIG. 2 or compiler 302 of FIG. 3.

The process begins as the compiler receives a result of an interprocedural analysis on a program comprising a first function and a second function (step 500). The compiler then determines whether the program can benefit from an optimization technique that requires breaking a calling convention of an operating system loaded on a computer on which the program will be executed after optimization (step 502).

If the program cannot benefit from the optimization technique, the process terminates. Otherwise, the compiler optimizes the program using the optimization technique, wherein the calling convention is broken during optimizing, and wherein the first function is modified as a result of optimizing (step 504). The compiler then mangles a name of the first function, wherein mangling comprises changing the name, wherein a unique first mangled name is formed, wherein the unique first mangled name includes, as a result of mangling, information conveying at least in part how the first function was modified, wherein a compilation tool can, after optimizing, use the first information to take a first action with respect to the first function, and wherein the compilation tool otherwise would require the calling convention to remain unbroken in order to take the first action (step 506).

The compiler then determines whether to take a first action using a compilation tool (step 508). This compilation tool can be part of the compiler or, in alternative illustrative embodiments; the compilation tool could be applied separately to the modified functions. Examples of compilation tools include post compilation tools, object code optimizers, and code instrumentation tools.

If the compiler determines not to take the first action, then the process terminates. Otherwise, the compilation tool uses the information to take the first action (step 510). The process terminates thereafter.

Thus, the illustrative embodiments provide for a computer-implemented method, computer program product, and data processing system for optimizing a program comprising a first function and a second function. A determination is received, after an interprocedural analysis that the program can benefit from an optimization technique that requires breaking a calling convention of an operating system loaded on a computer on which the program will be executed after optimization. The program is optimized using the optimization technique. The calling convention is broken during optimizing, and the first function is modified as a result of optimizing. A name of the first function is mangled to form a unique first mangled name. Mangling comprises changing the name. The unique first mangled name includes, as a result of mangling, first information conveying at least in part how the first function was modified. A compilation tool can, after optimizing, use the first information to take a first action with respect to the first function, wherein the compilation tool otherwise would require the calling convention to remain unbroken in order to take the first action.

A second function associated with the first function as a caller of the first function is also modified to correctly interpret the unique first mangled name and continue operation. The modification allows the first information passed in the first unique mangled name to be used to correctly process the broken calling convention of the first function. The requisite modification enables the second function to determine needed information including the linkage conventions of the modified first function, additional parameters that may be used, additional registers having values preserved across the call, additional register return values and to continue correct operation. The optimization technique applied to the first function in one embodiment is an interprocedural optimization technique.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention, the practical application, and to enable others of ordinary skill in the art to understand the invention for various embodiments, with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by, or in connection with, a computer or any instruction execution system. For the purposes of this description, a computer-usable or computer-readable medium can be any tangible apparatus that can contain, store, communicate, propagate, or transport the program for use by, or in connection with, the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments, with various modifications as are suited to the particular use contemplated.

What is claimed is:

1. A computer-implemented method for optimizing a program comprising a plurality of functions, and wherein the computer-implemented method comprises:

receiving a determination, as a result of an interprocedural analysis, that the program can benefit from an optimization technique that requires breaking a calling convention of an operating system loaded on a computer on which the program will be executed after optimization, wherein a scope of interprocedural analysis is defined by an interaction between a first function and a second function, wherein the first function and the second function use a same set of registers;

optimizing the program using the optimization technique, wherein the calling convention is broken during optimizing, and wherein the first function in the plurality of functions is modified as a result of optimizing;

mangling a name of the first function, wherein mangling comprises changing the name, wherein a unique first mangled name is formed, wherein the unique first mangled name includes, as a result of mangling, first information including an indication of a calling convention used and an incoming register and outgoing register usage conveying at least in part how the first function was modified, wherein a compilation tool can, after optimizing, use the first information to take a first action with respect to the first function, and wherein the compilation tool would otherwise require the calling convention to remain unbroken in order to take the first action; and responsive to the second function in the plurality of functions being a caller of the first function, modifying the second function to correctly invoke the first function using the unique first mangled name wherein the modifying allows the first information passed in the unique first mangled name to be used to correctly process the broken calling convention of the first function.

2. The computer-implemented method of claim 1 further comprising:

mangling a second name of the second function, wherein mangling comprises changing the second name, wherein a unique second mangled name is formed, and wherein the unique second mangled name includes, as a result of mangling, second information including an indication of the calling convention used and incoming register and outgoing register usage conveying at least in part how the second function was modified, and wherein the compilation tool can use the second information to take a second action with respect to the second function, and wherein the compilation tool otherwise would require the calling convention to remain unbroken in order to take the second action.

3. The computer-implemented method of claim 2 wherein optimizing is performed using an interprocedural compiler at link time, wherein the interprocedural compiler includes a first compilation unit for operating on the first function and a second compilation unit for operating on the second function, and wherein the method further comprises:

maintaining, using the interprocedural compiler, a consistent name mangling scheme relative to the unique first mangled name and the unique second mangled name.

4. The computer-implemented method of claim 3 wherein the consistent name mangling scheme ensures that custom calling conventions imposed by the interprocedural compiler are consistent in both the first compilation unit and the second compilation unit.

5. The computer-implemented method of claim 1 wherein optimizing the program using the optimization technique further comprises:

generating a version of the first function with standard calling conventions for use by callers unable to use the unique first mangled name or outside scope of the interprocedural analysis and optimization technique; and generating a version of the second function with standard calling conventions.

6. The computer-implemented method of claim 1 further comprising:

after optimizing, taking the first action using a post compilation tool using the first information to determine a nature of the optimization technique applied to the first function, wherein the optimization technique is an interprocedural optimization technique.

7. The computer-implemented method of claim 6 wherein the first action comprises ignoring the first function without reporting an error.

8. The computer-implemented method of claim 6 wherein the first action comprises determining, using the first information, values of variables assigned to registers in the same set of registers interprocedurally when performing the optimizing on the first function.

9. A non-transitory computer-recordable storage media storing computer-usable program code for performing a method for optimizing a program comprising a plurality of functions, and wherein the computer-implemented method comprises:

receiving a determination, as a result of an interprocedural analysis, that the program can benefit from an optimization technique that requires breaking a calling convention of an operating system loaded on a computer on which the program will be executed after optimization, wherein a scope of interprocedural analysis is defined by an interaction between a first function and a second function wherein the first function and the second function use a same set of registers;

optimizing the program using the optimization technique, wherein the calling convention is broken during optimizing, and wherein the first function is modified as a result of optimizing;

mangling a name of the first function, wherein mangling comprises changing the name, wherein a unique first mangled name is formed, wherein the unique first mangled name includes, as a result of mangling, first information including an indication of a calling convention used and an incoming register and outgoing register usage conveying at least in part how the first function was modified, wherein a compilation tool can, after optimizing, use the first information to take a first action with respect to the first function, and wherein the compilation tool would otherwise require the calling convention to remain unbroken in order to take the first action; and responsive to the second function in the plurality of functions being a caller of the first function, modifying the second function to correctly invoke the first function using the unique first mangled name wherein the modifying allows the first information passed in the unique first mangled name to be used to correctly process the broken calling convention of the first function.

10. The non-transitory computer-recordable storage media of claim 9 wherein the method further comprises:

mangling a second name of the second function, wherein mangling comprises changing the second name, wherein a unique second mangled name is formed, and wherein the unique second mangled name includes, as a result of mangling, second information including the indication of the calling convention used and incoming register and outgoing register usage conveying at least in part how the second function was modified, and wherein the compilation tool can use the second information to take a second action with respect to the second function, and wherein the compilation tool otherwise would require the calling convention to remain unbroken in order to take the second action.

11. The non-transitory computer-recordable storage media of claim 10, wherein optimizing is performed using an interprocedural compiler at link time, wherein the interprocedural compiler includes a first compilation unit for operating on the first function and a second compilation unit for operating on the second function, and wherein the method further comprises:
maintaining, using the interprocedural compiler, a consistent name mangling scheme relative to the unique first mangled name and the unique second mangled name.

12. The non-transitory computer-recordable storage media of claim 11 wherein the consistent name mangling scheme ensures that custom calling conventions imposed by the interprocedural compiler are consistent in both the first compilation unit and the second compilation unit.

13. The non-transitory computer-recordable storage media of claim 9 wherein optimizing the program using the optimization technique is performed and wherein the method further comprises:
generating a version of the first function with standard calling conventions for use by callers unable to use the unique first mangled name or outside scope of the interprocedural analysis and optimization technique; and
generating a version of the second function with standard calling conventions.

14. The non-transitory computer-recordable storage media of claim 9 wherein the method further comprises:
after optimizing, taking the first action using a post compilation tool using the first information to determine a nature of the optimization technique applied to the first function, wherein the optimization technique is an interprocedural optimization technique.

15. A data processing system comprising:
a bus;
a processor connected to the bus;
a memory storing computer-usable program code for performing a computer-implemented method for optimizing a program comprising a plurality of functions, and wherein the computer-implemented method comprises:
receiving a determination, as a result of an interprocedural analysis, that the program can benefit from an optimization technique that requires breaking a calling convention of an operating system loaded on a computer on which the program will be executed after optimization, wherein a scope of interprocedural analysis is defined by an interaction between a first function and a second function wherein the first function and the second function use a same set of registers;
optimizing the program using the optimization technique, wherein the calling convention is broken during optimizing, and wherein the first function of the plurality of functions is modified as a result of optimizing;
mangling a name of the first function, wherein mangling comprises changing the name, wherein a unique first mangled name is formed, wherein the unique first mangled name includes, as a result of mangling, first information including an indication of a calling convention used and an incoming register and outgoing register usage conveying at least in part how the first function was modified, wherein a compilation tool can, after optimizing, use the first information to take a first action with respect to the first function, and wherein the compilation tool would otherwise require the calling convention to remain unbroken in order to take the first action; and
responsive to the second function in the plurality of functions being a caller of the first function, modifying the second function to correctly invoke the first function using the unique first mangled name wherein the modifying allows the first information passed in the unique first mangled name to be used to correctly process the broken calling convention of the first function.

16. The data processing system of claim 15 wherein the method further comprises:
mangling a second name of the second function, wherein mangling comprises changing the second name, wherein a unique second mangled name is formed, and wherein the unique second mangled name includes, as a result of mangling, second information including the indication of the calling convention used and incoming register and outgoing register usage conveying at least in part how the second function was modified, and wherein the compilation tool can use the second information to take a second action with respect to the second function, and wherein the compilation tool would otherwise require the calling convention to remain unbroken in order to take the second action.

17. The data processing system of claim 16 wherein optimizing is performed using an interprocedural compiler at link time, wherein the interprocedural compiler includes a first compilation unit for operating on the first function and a second compilation unit for operating on the second function, and wherein the method further comprises:
maintaining, using the interprocedural compiler, a consistent name mangling scheme relative to the unique first mangled name and the unique second mangled name.

18. The data processing system of claim 17 wherein the consistent name mangling scheme ensures that custom calling conventions imposed by the interprocedural compiler are consistent in both the first compilation unit and the second compilation unit.

19. The data processing system of claim 15 wherein optimizing the program using the optimization technique is performed and wherein the method further comprises:
generating a version of the first function with standard calling conventions for use by callers unable to use the unique first mangled name or outside scope of the interprocedural analysis and optimization technique; and
generating a version of the second function with standard calling conventions.

20. The data processing system of claim 15 wherein the method further comprises:
after optimizing, taking the first action using a post compilation tool using the first information to determine a nature of the optimization technique applied to the first function, wherein the optimization technique is an interprocedural optimization technique, wherein the first action comprises determining values of variables that may have been assigned to registers in the same set of registers interprocedurally.

* * * * *